United States Patent
Burgener, II et al.

(10) Patent No.: US 7,184,203 B2
(45) Date of Patent: Feb. 27, 2007

(54) RARE EARTH COMPOUNDS HAVING PHOTO-LUMINESCENT PROPERTIES AND APPLICATIONS THEREOF

(76) Inventors: Robert H. Burgener, II, 418 W. Winchester St., Murray, UT (US) 84107; Roger L. Felix, 2391 N. 180 West, Pleasant Grove, UT (US) 84062; Gary M. Renlund, 2094 E. Worchester Dr., Salt Lake City, UT (US) 84121

( * ) Notice: Subject to any disclaimer, the term of this patent is extended or adjusted under 35 U.S.C. 154(b) by 289 days.

(21) Appl. No.: 10/778,805

(22) Filed: Feb. 13, 2004

(65) Prior Publication Data

US 2004/0196538 A1    Oct. 7, 2004

Related U.S. Application Data

(60) Provisional application No. 60/448,992, filed on Feb. 21, 2003.

(51) Int. Cl.
*G02F 2/02*    (2006.01)
*G02F 1/355*   (2006.01)

(52) U.S. Cl. ...................... 359/326; 359/350
(58) Field of Classification Search ............... 359/326, 359/350
See application file for complete search history.

(56) References Cited

U.S. PATENT DOCUMENTS 4,935,722 A  *  6/1990  Pollack ........................ 340/479
5,891,361 A  *  4/1999  Kane ..................... 252/301.4 H

FOREIGN PATENT DOCUMENTS

| JP | 358040381 A | * | 3/1983 |
| JP | 360040188 A | * | 3/1985 |
| JP | 405086367 A | * | 4/1993 |
| JP | 407242872 A | * | 9/1995 |
| JP | 407310074 A | * | 11/1995 |

OTHER PUBLICATIONS

Kouyate, D., Ronfard-Haret, J.-C., and Kossanyi, J.; Photo- and electro-luminescence of rare earth-doped semiconducting zinc oxide electrodes: Emission from both the dopant and the support; Journal of Luminescence; 1991; pp. 205-210; vol. 50; Elsevier Science Publishers B.V.

(Continued)

*Primary Examiner*—John D. Lee
(74) *Attorney, Agent, or Firm*—Kirton & McConkie; Evan R. Witt

(57) ABSTRACT

Up-conversion and down-conversion photo-luminescence in rare earth compounds are disclosed. Broadband, super-radiant, and discrete line emissions are observed. The rare earth compounds include a rare earth element and at least one other element selected from chalcogens, halogens, nitrogen, and phosphorus. The rare earth compounds include, but are not limited to, rare earth oxides, fluorides, and oxyfluorides. Doping and co-doping of rare earth compounds in an optical host material is not required. The compounds are irradiated with incident light having an incident wavelength that is selected to be highly absorbed by the rare earth compound. The up-conversion and down-conversion luminescence have been observed which may be caused by unknown electron transitions, particularly in the case of ytterbia.

36 Claims, 12 Drawing Sheets

OTHER PUBLICATIONS

Kossanyi, J., Kouyate, D., Pouliquen, J., Ronfard-Haret, J.C., Valat, P., et al.; Photoluminescence of Semiconducting Zinc Oxide Containing Rare Earth Ions as Impurities; Journal of Luminescence; 1990; pp. 17-24; vol. 46; Elsevier Science Publishers B.V. (north-Holland).

Bhushan, S., Pandey, A.N., and Kaza, B.R.; Photo- and Electroluminescence of Undoped and Rare Earth Doped ZnO Electroluminors; Journal of Luminescence; 1979; pp. 29-38; vol. 20; North-Holland Publishing Company.

Jadwisienczak, W.M., Lozykowski, H.J., Xu, A., and Patel, B.; Visible Emission from ZnO Doped with Rare-Earth Ions; Journal of Electronic Materials, 2002; pp. 776-784; vol. 31.

Wang, Y.G., Lau, S.P., Lee, H.W., Yu, S.F., Tay, B.K., et al.; Photoluminescence study of ZnO films prepared by thermal oxidation of Zn metallic films in air; Journal of Applied Physics; Jul. 1, 2003; pp. 354-358; vol. 94, No. 1; American Institute of Physics.

Xiong, G., Wilkinson, J., Lyles, J., Ucer, K.B., and Williams, R.T.; Luminescence and stimulated emission in zinc oxide nanoparticles, films, and crystals, no journal name, no date.

Agne, T., Guan, Z., Li, X.M., Wolf, H., and Wichert, T.; Incorporation of the Donor Indium in Nanocrystalline ZnO: phys. stat. sol.; 2002; pp. 819-823; vol. 229; Wiley-VCH Verlag Berlin GmbH; Berlin.

Ronfard-Haret, J.C., Kossanyi, J., and Pastol, J.L.; Electroluminescence of the $Er^{3+}$ ion and the electric conduction in polycrystalline ZnO:Mn,Bi,Er sintered pellets; Journal of Physics and Chemistry of Solids; 2001; pp. 565-578; vol. 62; Elsevier Science Ltd.

Magne, S., Ouerdane, Y., Druetta, M., Goure, J.P., Ferdinand, P., et al.; Cooperative luminescence in an ytterbium-doped silica fibre; Optics Communications; Oct. 1, 1994; pp. 310-316; Elsevier Science B.V.

Wegh R.T., and Meijerink, A.; Cooperative luminescence of ytterbium(III) in $La_2O_3$; Chemical Physics Letters; Dec. 1, 1995; pp. 495-498; vol. 246; Elsevier Science B.V.

Burshtein, Z., Kalisky, Y., Levy, S.Z., Le Boulanger, P., Rotman; Impurity Local Phonon Nonradiative Quenching of $Yb^{3+}$ Flourescence in Ytterbium-Doped Silicate Glasses; IEEE Journal of Quantum Electronics; Aug. 8, 2000; pp. 1000-1007; vol. 36, No. 8; IEEE.

Bachir, S., Kossanyi, J., Sandouly, C., Valat, P., and Ronfard-Haret, J.C.; Electroluminescence of $Dy^{3+}$ and $Sm^{3+}$ Ions in Polycrystalline Semiconducting Zinc Oxide; J. Phys. Chem; 1995; pp. 5674-5679; vol. 99; American Chemical Society.

Bachir, S., Kossanyi, J., and Ronfard-Haret, J.C.; Electroluminescence of $Ho^{3+}$ Ions in a ZnO Varistor-Type Structure; Solid State Communications; 1993; pp. 859-863; vol. 89, No. 10; Elsevier Science Ltd.; Great Britain.

Bachir, S., Sandouly, C., Kossanyi, J., and Ronfard-Haret, J.C.; Rare Earth-Doped Polycrystalline Zinc Oxide Electroluminescent Ceramics; J. Phys. Chem. Solids; 1996; pp. 1869-1879; vol. 57, No. 12; Elsevier Science Ltd.; Great Britain.

Ronfard-Haret, J.C., and Kossanyi, J.; Electro- and photoluminescence of the $Tm^{3+}$ ion in $Tm^{3+}$ and Li+-doped ZnO ceramics: Influence of the sintering temperature; Chemical Physics; 1999; pp. 339-349; vol. 241; Elsevier Science B.V.

Keir, P.D., Maddix, C., Baukol, B.A., Wager, J.F., Clark, B.L., et al.; Lanthanide doping in ZnS and SrS thin-film electroluminescent decives; Journal of Applied Physics; Dec. 15, 1999; pp. 6810-6815; vol. 86, No. 12; American Institute of Physics.

Feng, X., Qi, C., Lin, F., and Hu, H.; Spectroscopic Properties and Laser Performance Assessment of $Yb^{3+}$ in Borophosphate Glasses; J. Am. Ceramics Soc.; 1999; pp. 3471-3475; vol. 82.

Takebe, H., Murata, T., and Morinaga, K.; Compositional Dependence of Absorption and Flourescence of $Yb^{3+}$ in Oxide Glasses; J. Am. Ceramics Soc.; Mar. 1996; pp. 681-686; vol. 79, No. 3.

Maeno, T., and Morisaki, S.; Electroluminescence from Barrier-Type Anodic Oxide Alumina Films Doped with Rare-Earth and Transition Metals by Ion-Implantation; Japanese Journal of Applied Physics; 2000; pp. 6296-6300; vol. 39; The Japan Society of Applied Physics.

Wu, X., Denis, J.P. Ozen, G., Goldner, P., and Pelle, F.; The Blue Up-Conversion Luminescence of $Er^{3+}$ Ions In Vitroceramics Doped with $Yb^{3+}$ Under Infrared Excitation; Solid State Communications; 1993; pp. 351-354; vol. 85, No. 4; Pergamon Press Ltd.; Great Britain.

Hehlen, M.P., Cockroft, N.J., and Gosnell, T.R.; Spectroscopic properties of $ER^{3+}$- and $Yb^{3+}$-doped soda-lime silicate and aluminosilicate glasses; Physical Review B; Oct. 15, 1997; pp. 9302-9318; vol. 56, No. 15; The American Physical Society.

Minami, T., Kobayashi, Y., Miyata, T., and Suzuki, S.; High-Luminance Thin-Film Electroluminescent Devices Using $((Y_2O_3)_{0.6}-(GeO_2)_{0.4})$:Mn Phosphors; Japanese Journal of Applied Physics; 2002; pp. L577-L579; vol. 41; The Japan Society of Applied Physics.

Cisse, L., Teyssedre, G., and Mary, D.; Influence of Frequency, Electrode Material and Superimposed dc on ac Electroluminescence in Polymer Films; IEEE Transactions on Dielectrics and Electrical Insulation; Feb. 2002; pp. 124-129; vol. 9, No. 1; IEEE.

Das, S., Chowdhury, A., and Pal, A.J.; Alternating-Current and Direct-Current Responses of Light-Emitting Devices Based on Decacyclene Langmuir-Blodgett Films; phys. stat. sol.; 2001; pp. 383-389; vol. 185, No. 2.

Roy, S., and Pal, A.J.; A Study of Organic Light-Emitting Devices Based on Electrostatic Self-Assembled Films of Evansd Blue under AC Voltage; phys. stat. sol.; 2002; pp. 367-376; vol. 193, No. 2; Wiley-VCH Verlag GmbH & Co. KGaA, Weinheim.

Allieri, B., Peruzzi, S., Antonini, L., Speghihi, A., Bettinelli, M., et al.; Spectroscopic characterization of alternate current electroluminescent decives based on ZnS-Cu; Journal of Alloys and Compounds; 2002; pp. 79-81; Vo. 341; Elsevier Science B.V.

Minami, T., Yamazaki, M., Miyata, T., and Shirai, T.; Mn-Activated $Y_2O_3$-$GeO_2$ Phosphors for Thin-Film Electroluminescent Devices; Japanese Journal of Applied Physics; 2001; pp. L864-L866; vol. 40; The Japan Society of Applied Physics.

Chase, E.W., Hepplewhite, R.T., Krupka, D.C., and Kahng, D.; Electroluminescence of ZnS Lumocen Devices Containing Rare-Earth and Transition-Metal Flourides; Journal of Applied Physics; May 1969; pp. 2512-2519; vol. 40, No. 6.

Pederson, L.R., Chou, Y-S., Coffey, G.W., Hardy, J.S., Kerstetter, K.J., et al.; Solid Oxide Electrolyte Systems; Accessed online Apr. 22, 2003, 11 pages.

Hwang, H.J., Towata, A., and Awano, M.; Fabrication of Lanthanum Maganese Oxide Thin Films on Yttria-Stabilized Zirconia Substrates by a Chemically Modified Alkoxide Method; Journal of the American Ceramic Society; 2001; pp. 2323-2327; vol. 84.

Leontiou, A.A., Ladavos, A.K., and Pomonis, P.J.; Catalytic NO reduction with CO on $LA_{1-x}Sr_x(Fe^{3+}/Fe^{4+})O_{3\pm\delta}$ perovskite-type mixed oxides(x=0.00, 0.15, 0.30, 0.40, 0.60, 0.70, 0.80, and 0.90); Applied Catalysis; 2003; pp. 133-141; vol. 241; Elsevier Science B.V.

Petrik, N.G., Alexandrov, A.B., and Vall, A.I.; Interfacial Energy Transfer during Gamma Radiolysis of Water on the Surface of $ZrO_2$ and Some Other Oxides; J. Phys. Chem. B; 2001; pp. 5935-5944; vol. 105 ; American Chemical Society.

* cited by examiner

US 7,184,203 B2

RARE EARTH COMPOUNDS HAVING PHOTO-LUMINESCENT PROPERTIES AND APPLICATIONS THEREOF

CROSS-REFERENCED RELATED APPLICATIONS

This application claims the benefit of U.S. Provisional Application No. 60/448,992, filed Feb. 21, 2003, which is incorporated by reference.

BACKGROUND OF THE INVENTION

The present invention provides rare earth compounds exhibiting photo-luminescent properties when irradiated, apparatus, and methods for their use. Specifically, the invention provides rare earth compounds that produce continuous broadband, super-radiant, and discrete line emissions by up-conversion and/or down-conversion of the incident light. The broadband emission may be visible.

Wavelength up-conversion and down-conversion are known phenomena. Any material with radiative transitions between more than two energy levels could be used, in principle, as an up- and as a down-converter. Such a material would emit light at discrete wavelengths corresponding to the radiative energy level transitions.

Up-conversion comes from inducing successive absorption in a single ion. This can lead to up-conversion emission through a scheme termed Excited State Absorption (ESA) while other schemes involve two and three phonon assisted energy transfers such as in Ground State Absorption (GSA), Energy Transfer Up-conversion (ETU), and Addition of photon by Transfer of Energy (APTE). Up-conversion by sequential ground-state excitation/excited state excitation (GSA/ESA) involves a two step excitation of electrons from the valence band via an intermediate level into the conduction band by absorption of two low energy photons followed by a radiative transition of the electron from the conduction band into the valence band.

Down-conversion involves the reverse processes, i.e. absorption of one high-energy photon by a band-band transition and the subsequent transition of the electron into the valence band in a two-step process via the intermediate level, with one low-energy photon emitted in each intermediate step.

Many infrared-to-visible up-conversion materials are known to emit light at a discrete visible wavelength. Some of these materials are commonly used in laser applications, others as phosphors, to convert infrared emissions to visible laser and light emissions. Most of these materials consist of crystals or glasses that contain one or more dopants of rare earth element compounds.

Trivalent ytterbium ion ($Yb^{3+}$) has been used as a sensitizer of energy transfer for infrared to visible up-conversion laser. There are only two known energy levels for trivalent ytterbium, the $^2F_{7/2}$ ground state and $^2F_{5/2}$ excitation state. Since there are only two known energy levels for $Yb^{3+}$, it would not be expected to produce up-converted or down-converted luminescence alone. Instead, $Yb^{3+}$ has commonly been used as a sensitizer for at least one other rare earth ion. The electron transition between $^2F_{7/2}$ and $^2F_{5/2}$ occurs at about $10^4$ $cm^{-1}$ energy level or at about 1,000 nm wavelength of light. The $Yb^{3+}$ absorbs energy at about 976 nm. Under pumping of an infrared laser diode, $Yb^{3+}$ ion at ground state is excited to $^2F_{5/2}$ excitation state. The excited $Yb^{3+}$ transfers its energy to a nearby rare earth ion, such as a $Tm^{3+}$, $Ho^{3+}$, or $Er^{3+}$ ion, which then emits visible light through other known electron transitions.

Down-conversion is a more common phenomenon. As an example, fluorescent light devices commonly contain mercury vapor which when electrically excited emits ultraviolet light at about 253 nm wavelength. High energy ultraviolet photons are down-converted into the visible region of the light spectrum by interaction of the UV wavelength light with down-converting phosphors coated on the inside of the fluorescent glass tubes. In addition, some visible LED devices are based upon a gallium nitride ultraviolet emitter using down conversion phosphors to generate white light.

Solid state devices that emit infrared light are generally of lower cost than similar devices that emit visible or ultraviolet light. It would be an advancement in the art to provide materials that efficiently up-convert infrared light such that low-cost light sources may be used to produce more valuable visible and UV light. It would also be an advancement in the art to provide materials that efficiently down-convert UV light to broadband or desired discrete wavelength luminescent light.

As mentioned above, currently known up-converting luminescent materials emit light at discrete wavelengths. It will be appreciated that broadband emissions, especially in the visible region, would have valuable applications for general lighting applications and for tunable laser applications.

BRIEF SUMMARY OF THE INVENTION

The invention provides methods and apparatus of up-converting and/or down-converting incident light utilizing rare earth compounds that produce broadband, super-radiant, and discrete line emissions. The luminescent emissions may be visible.

The rare earth compounds used in the present invention include a rare earth element and at least one other element selected from chalcogens, halogens, nitrogen, phosphorus, and carbon. The rare earth element may be selected from lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). Ytterbium (Yb), erbium (Er), samarium (Sm), and praseodymium (Pr) have been found to be particularly effective.

The rare earth element should be oxidized. The most common oxidation state for the rare earth elements is the trivalent state; however, europium and ytterbium have stable +2 oxidation states, and cerium has a stable +4 oxidation state. For example, the rare earth compound may include rare earth oxides, rare earth oxyfluorides, and rare earth fluorides. These are examples of rare earth compounds prepared with chalcogen and halogen anions. Rare earth compounds in the +2, +3, or +4 oxidation state may also be prepared with nitrogen, phosphorus, and carbon anions. Without being bound by theory, it is believed that the trivalent oxidation state of the rare earth element is important to obtain the photo-luminescent properties within the scope of the present invention.

Rare earth oxides have been found to be particularly effective in up-converting and/or down-converting incident light. Ytterbia ($Yb_2O_3$), erbia ($Er_2O_3$), and samaria ($Sm_2O_3$) have provided good results according to the present invention.

The rare earth compound is irradiated with incident light having an incident wavelength that is selected to be highly absorbed by the rare earth compound. The absorbance of the rare earth compound may be determined spectroscopically or may be based upon known or published absorbance data for the rare earth element. The incident wavelength is preferably selected to at maximum or near-maximum absorbance. If incident wavelengths that are not highly absorbed are used, then the up-conversion or down-conversion efficiency will be lower. As an example, trivalent ytterbium is known to absorb infrared light at about 976 nm, so incident light at 976 nm is highly absorbed by trivalent ytterbium compounds. For up-conversion applications, the incident light is typically infrared light, but it may also be long wavelength visible light such as red light. For down-conversion applications, the incident light is typically ultraviolet light, but it may be short wavelength visible light such as blue light. The present invention is intended to include up-conversion and down-conversion of other forms of electromagnetic radiation, such as the up-conversion of microwaves and the down-conversion of x-rays.

The rare earth compound is irradiated at a sufficient intensity to induce luminescent emission at wavelengths that are shorter than the incident wavelength (for up-conversion) or at wavelengths that are longer than the incident wavelength (for down-conversion). Without being bound by theory, it is believed the incident light causes localized heating of the rare earth compound which induces electron transitions leading to up-conversion and/or down-conversion. Based upon observed emissions, it is believed the electron transitions do not normally occur at room temperature such that they are unknown or unreported in the literature.

In some cases, super-radiant visible emissions have been observed in accordance with the invention. As used herein, super-radiance describes intense white light covering a broad spectrum. The spectrum may cover all or part of the visible spectrum ranging from about 400 to 800 nm. Super-radiance has been observed in rare earth compounds which show discrete photo-luminescence at lower power, but after increasing the incident light power beyond a certain threshold, the discrete photo-luminescence changes to white super-radiant emission. The super-radiant emissions have been calculated to be greater than about 50% efficient, based upon the incident light intensity. In one example, the super-radiant visible emission was between about 50% and 60% efficient based upon the incident light intensity.

In some cases, the luminescent emissions were broadband emission instead of discrete emission lines. Some of the broadband emissions had line widths at half height greater than about 100 nm, and some line widths at half height were greater than about 200 nm. In other cases, the luminescent emissions had discrete emission lines having a line width at half height less than about 60 nm.

The rare earth compound need not be doped in an optical host material. The up-conversion and down-conversion properties of the rare earth compounds were observed in the pure compound and in optical host materials doped with the rare earth compound. Co-doping of multiple rare earth compounds is not required, but co-doping may be used in some cases optimize performance or color output. If a host material is used, better results have typically been obtained as the concentration of rare earth compounds is maximized in the host material. Typical doping concentrations have ranged from about 10% to about 50% by weight. The maximum concentration is usually limited by the solubility of the dopant in the host material, because the host material should form a single phase with the rare earth compound or ion. It would be undesirable to have separate phases or compounds within the optical host material which could create light interference and decrease optical efficiency. The minimum concentration may vary depending on the activity of the dopant in the host material. Doping concentrations less than 10% by weight may be effective. The host material may be an optical material, such as a glass or crystal.

Particularly surprising results were observed when trivalent ytterbium, in the form of ytterbium oxide, was irradiated with light having a wavelength of about 976 nm±about 25 nm. At lower power levels, discrete emission lines were observed, particularly at about 480 nm, 661 nm, 806 nm. At high power levels, a broadband emission appeared to overwhelm the discrete emission lines and appear as a bright, high intensity visible emission. With ytterbia, the up-conversion luminescent efficiency was greater than about 50% based upon the incident light. One or more filters may be used to block emitted light at undesired wavelengths and isolate emitted light at a desired wavelength. This would allow one to tailor the output emission to desired applications, such as polymeric curing and communication applications. This may also enable other useful applications, including tunable visible laser applications.

BRIEF DESCRIPTION OF THE SEVERAL VIEWS OF THE DRAWINGS

A more particular description of the invention briefly described above will be rendered by reference to specific embodiments thereof which are illustrated in the appended drawings. These drawings depict only typical embodiments of the invention and are not therefore to be considered to be limiting of its scope. The invention will be described and explained with additional specificity and detail through the use of the accompanying drawings in which.

DETAILED DESCRIPTION OF THE INVENTION

Figure 1:
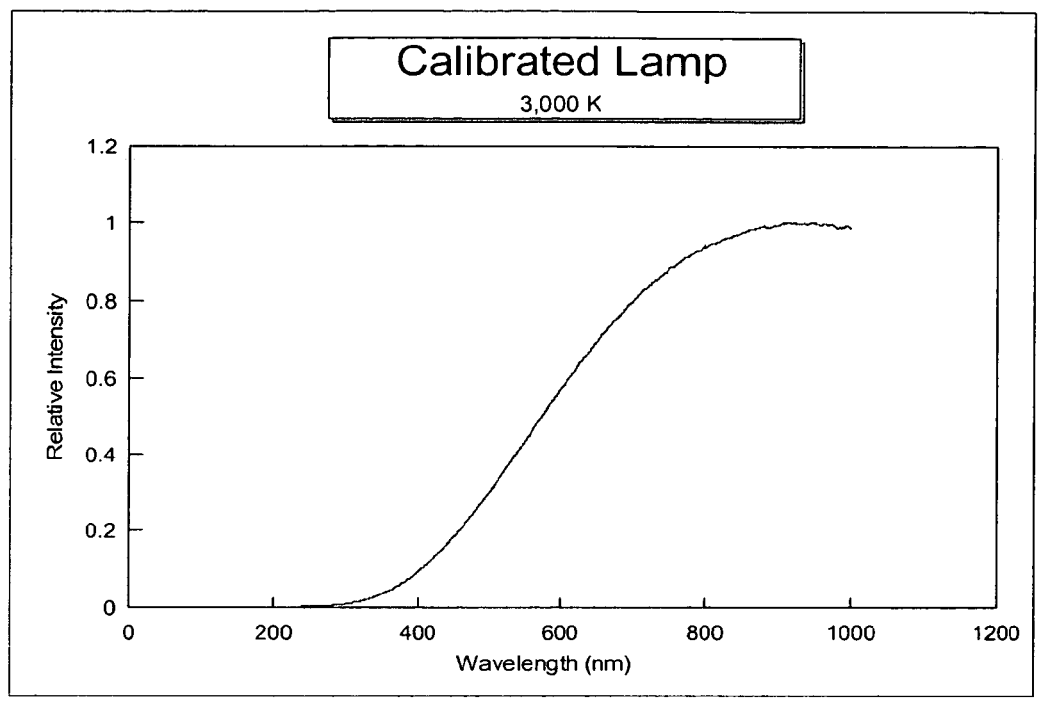
FIG. 1 is a graph of Planck's equation for a body radiating at 3000 K.

The invention provides rare earth, or lanthanide-series, compounds that emit non-thermal light when irradiated. These compounds and applications are referred to as being "photo-pumped" to produce luminescence. The rare earth compounds include a rare earth element and at least one other element selected from chalcogens, halogens, nitrogen, phosphorus, and carbon. The rare earth element may be selected from lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). In some currently preferred embodiments, the rare earth compound is a rare earth oxide, a rare earth oxyfluoride, or a rare earth fluoride.

In some applications, it may be desirable to bind the rare earth compound in a host material, although for photo-pumped applications, such host materials are generally not necessary. In fact, while co-doping of rare earth compounds in host materials is known in the art, the present invention provides unexpected up-conversion and down-conversion without mixtures of rare earth compounds and without the need of a host material. However, mixtures of rare earth compounds may be used to produce luminescent up-conversion and down-conversion and specific desired wavelengths. If doping of a host material is desired, the host material should form a single phase with the rare earth compound or ion. It would be undesirable to have separate phases or compounds within the optical host material which could create light interference. The host material is preferably optically transparent or translucent with a wide band gap greater than about 2 eV. The host is preferably an electronic insulator. Because the beneficial up-conversion and down-conversion properties are believed to be temperature activated, the host material is preferably stable at high temperatures. The host material may be an optical material, such as a glass or crystal.

Typical rare earth oxide compounds that may be used include: lanthanum oxide ($La_2O_3$), cerium oxide ($Ce_2O_3$), praseodymium oxide ($Pr_2O_3$), neodymium oxide ($Nd_2O_3$), samarium oxide ($Sm_2O_3$), europium oxide ($Eu_2O_3$), gadolinium oxide ($Gd_2O_3$), terbium oxide ($Tb_2O_3$), dysprosium oxide ($Dy_2O_3$), holmium oxide ($Ho_2O_3$), erbium oxide ($Er_2O_3$), thulium oxide ($Tm_2O_3$), and ytterbium oxide ($Yb_2O_3$). These compounds will be referred to collectively herein as "lanthanide series oxides" or "rare earth oxides." In specific preferred embodiments of the invention, the compositions include ytterbia ($Yb_2O_3$), erbia ($Er_2O_3$), praseodymia ($Pr_2O_3$), and samaria ($Sm_2O_3$).

These compositions emit light when irradiated at a wavelength which is highly absorbed by the rare earth compound. Known absorption bands of rare earth elements are available in the literature, or may be determine spectrophotometrically.

The radiation emitted by a body, a material in a condensed state, as a result of temperature is called thermal radiation. This emitted radiation is a continuous spectrum that is strongly dependent on temperature and is nearly independent on the chemical composition of the body. At room temperature, bodies are observed by the light they reflect. At elevated temperatures bodies become self-luminous. This self-luminous thermal radiation confined within a cavity is referred to as "black-body" radiation. Planck's equation describes the energy density at a given wavelength, at a fixed temperature.

Equation 1 (Planck's Equation):

$$\rho_T(\lambda)d\lambda = \left(\frac{8\pi hc}{\lambda^5}\right)\left(\frac{d\lambda}{e^{hc/\lambda kT}-1}\right)$$

Where: h is planck's constant
k is boltzman's constant
c is the speed of light
$\lambda$ is the wavelength of the light
T is the temperature in Kelvin The Planck equation can be rearranged into the form of a line by making the assumption that $e^{hc/\lambda kT} - 1$ can be replaced by $e^{hc/\lambda kT}$. The approximate error over the wavelengths of interest 190 nm to 1,000 nm is negligible at the lower wavelengths and increases to about 0.8% at 1,000 nm.

By taking the natural log of both sides of the equation, then by plotting Ln (Intensity* $\lambda^5$) verses $1/\lambda$, Planck's equations is in the form of a straight line with the slope of the line being directly related to the temperature of the body, through the following Equation.

Equation 2:
$$T(K) = -1240 eV/8.6\times10^{-5} \times \text{slope of the line}$$

In order to test the validity of this method for calculating the temperature of a body, a graph of Planck's equation was prepared and illustrated in FIG. 1 for a body radiating at 3000 K. This graph was taken on a calibrated lamp using an Ocean Optics spectrophotometer with a wavelength range of 190 nm up to 1000 nm.

Figure 2:
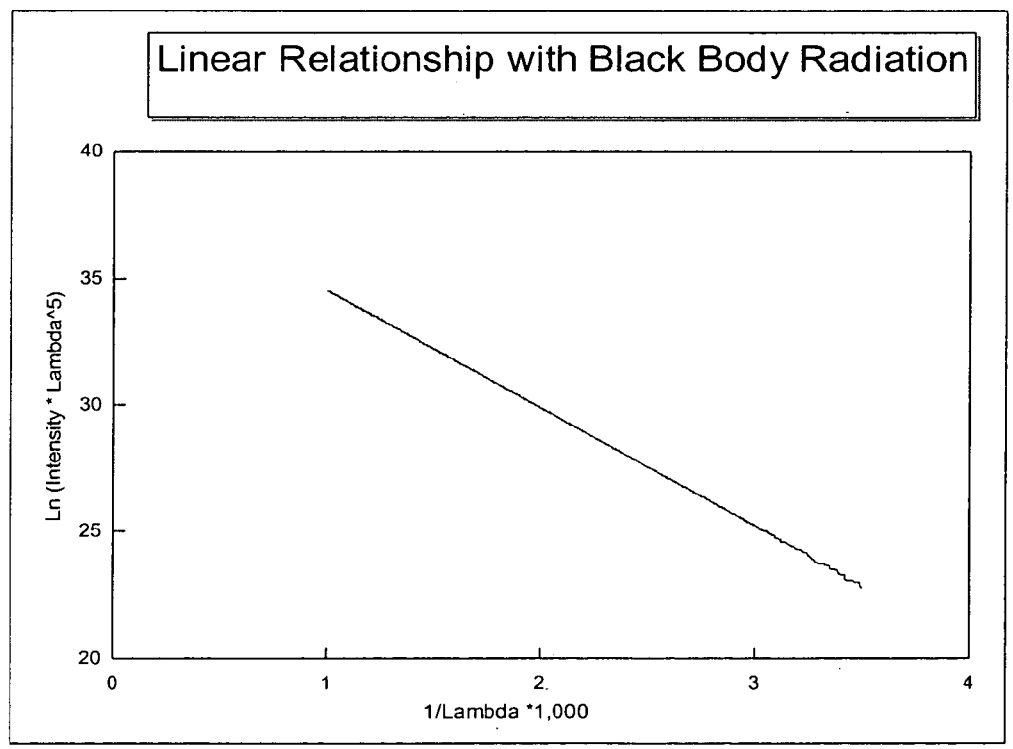
FIG. 2 is a graph of the same data in FIG. 1 plotted in a linearized form based upon the black-body equation.

FIG. 2 shows a graph of the same data in FIG. 1 after plotting the data in the form of a straight line. By back calculating from the slope of the line, one gets a temperature of 3008 K, which is in good agreement with the calibrated color temperature of the lamp.

In some cases light emission spectra are not a result of black-body radiation, but are a result of light emitting from electron transitions. When a molecule drops from a high energy state into a lower one, the excess energy may be emitted as a photon. One can observe and measure the frequencies corresponding to each transition energy. If the transition is from a state of energy $E_1$ to a state of energy $E_2$, the spectrum shows a line at a frequency $v$ given by the equation:

$$hv = E_1 - E_2 \qquad \text{Equation 3:}$$

Where h is Planck's constant and $v$ is the frequency of the emitted light. By measuring the luminescent spectrum of a sample and then comparing the measured spectrum with predicted thermal black-body spectrum, one may determine whether the observed luminescence is a result of non-thermal emissions.

Regardless of whether light emission is a result of black-body radiation, electron transitions, or other phenomena, the observed color of the emitted light may be correlated with a color temperature according to Planck's equation. Reference to a color temperature does not mean that the object emitting the light was actually at that temperature. For example, the temperature of the sun is about 5500 K and the typical temperatures in incandescent lighting applications (thermal light) range from 2000 K to 3200 K. Yet the observed color temperatures for some of the emissions within the scope of the present invention have exceeded 7000 K, and even exceeded 10,000 K.

EXAMPLES

The following examples are given to illustrate various embodiments within the scope of the present invention. These are given by way of example only, and it is to be understood that the following examples are not comprehensive or exhaustive of the many embodiments within the scope of the present invention.

Example 1

Figure 3:
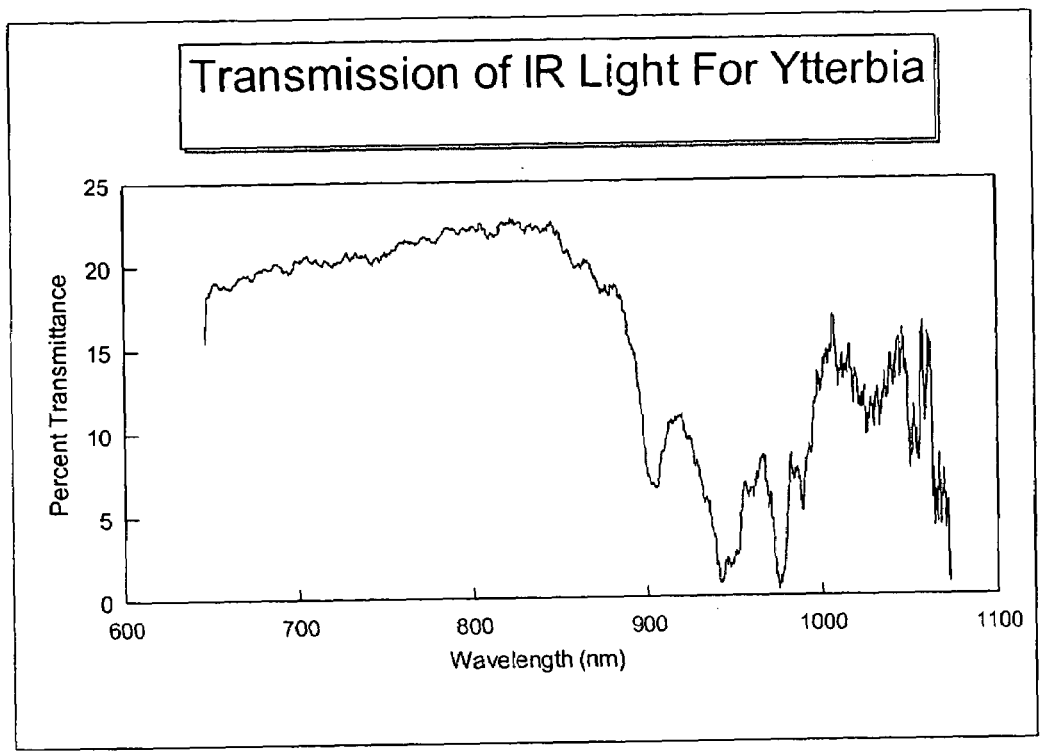
FIG. 3 is a graph of the transmission spectrum for ytterbium oxide.

Ytterbium oxide was tested for transmission of light in the visible into the infrared region to see where the absorption was optimal for laser diode irradiation. The transmission spectrum for ytterbium oxide is shown in FIG. 3. The areas of very low transmission indicate wavelengths which are highly absorbed by the ytterbium oxide. It is preferred to match the wavelength of the incident light to a wavelength that is highly absorbed by the rare earth compound. In this way, the amount of energy absorbed by the compound is maximized which tends to maximize the amount of energy which is ultimately emitted by the compound via up-conversion or down-conversion luminescence.

Figure 4:
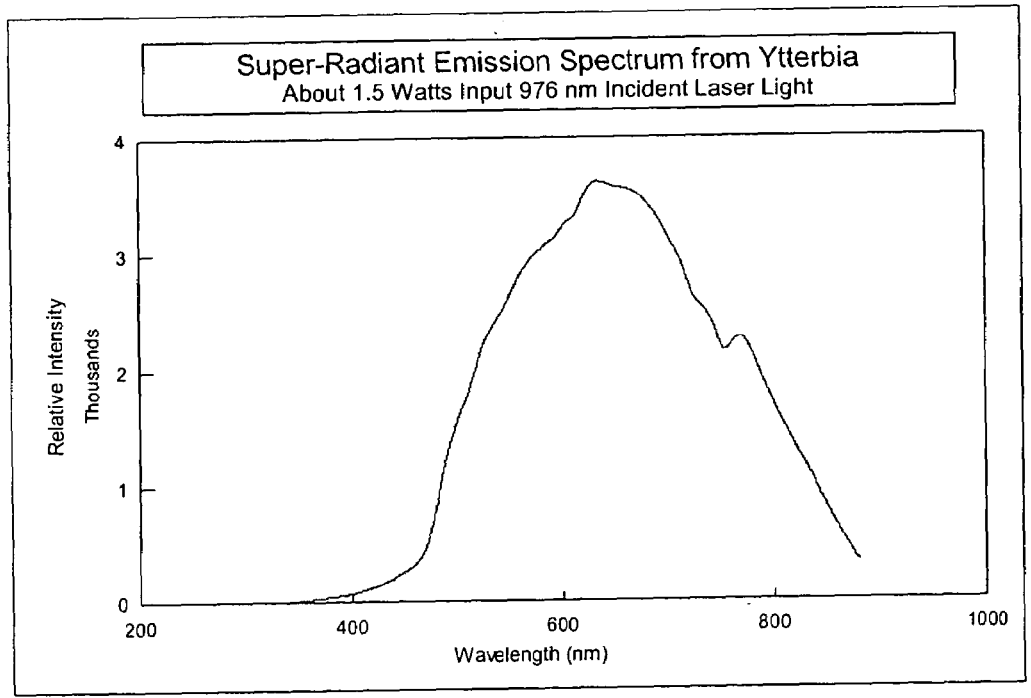
FIG. 4 is a graph of the spectrum of the luminescent light derived from ytterbium oxide irradiated with incident light having a wavelength of about 976 nm at a power of about 1.5 watts.

It was found that the highest absorption for ytterbium oxide was at about 976 nm wavelength light. A semiconductor laser was temperature tuned to this wavelength and was capable of about 1.5 watt total output power and covered an area of about 50 μm×150 μm. The ytterbium oxide was irradiated with infrared light at about 976 nm. FIG. 4 shows the spectrum of the output light derived from the irradiated ytterbium oxide. This figure is a graph of relative intensity of reflected light plotted against the wavelength of the light. This curve is shown for the highest light irradiation power possible with this particular laser, about 1.5 watts.

The reflected light from the ytterbium oxide was estimated to be about 50% to 60% efficient. The efficiency was determined by measuring the light emission with a light collection detector at 1 cm distance and 1 $cm^2$ aperture. The measured light was extrapolated over a 360 spherical degrees. To check the accuracy of the extrapolation method, an integrating sphere was built. The light emission was measured and compared to the extrapolated values. Because there was close agreement, the simpler extrapolation method was used for efficiency measurement.

Due to the extreme brightness of the light, it is described as bright and "super-radiant." Uncomfortable viewing occurred within a few seconds. The super-radiant emission was unexpected because it was white light covering a broad visible spectrum. As shown in FIG. 4, the emission spectrum broadly covered the visible spectrum. The width at half height was greater than 200 nm.

Figure 5:
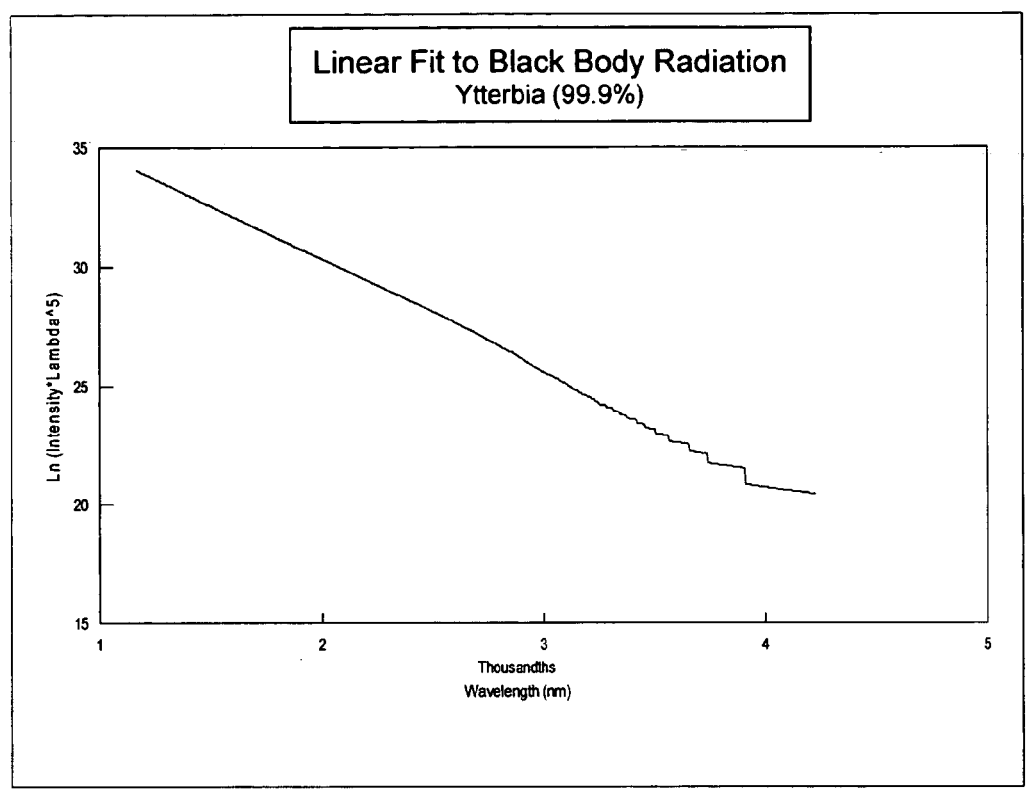
FIG. 5 is a graph of the same data in FIG. 4 plotted in a linearized form based upon the black-body equation.

To see if the light from the spectrum shown in FIG. 4 was due to black-body radiation, it was graphed in accordance with the black-body equation described above. FIG. 5 is a graph of a linear fit for the black-body equation. There is a subtle slope change indicating two different color temperatures. The upper portion of the graph in FIG. 5 has a slope of about −4.381, and the lower portion of the graph has a slope of about −4.878. To a good approximation all this light can be considered to be due to two color temperatures with a change in slope at about 2,800 nm. The existence of two different color temperatures indicates that at least a portion of the emission is not attributable to black-body radiation.

Figure 6:
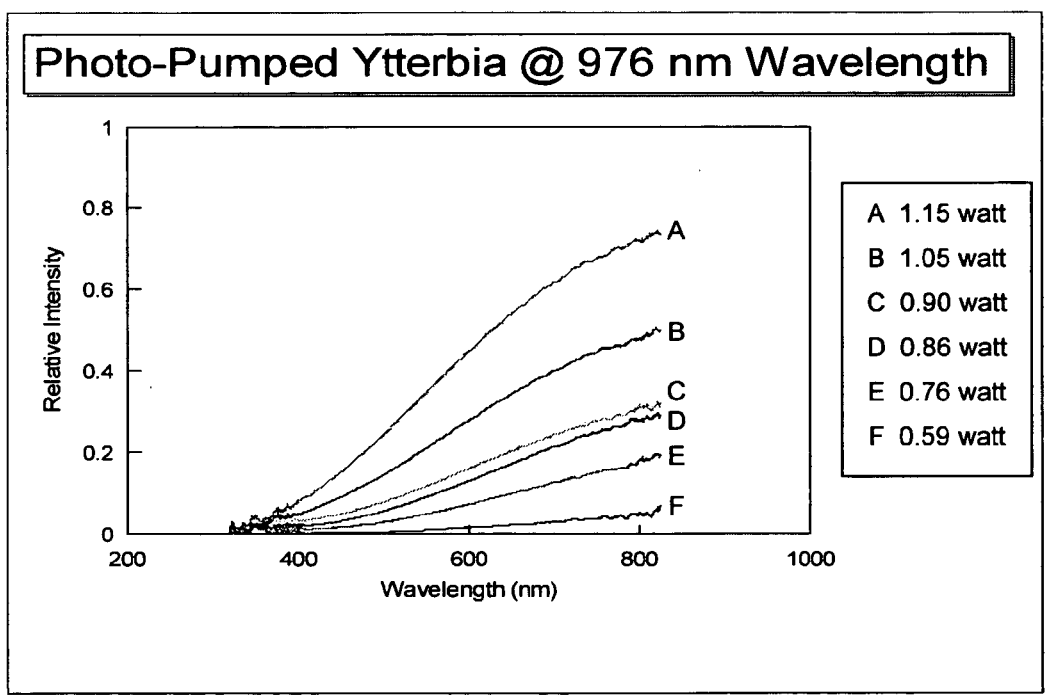
FIG. 6 is a graph of relative intensity of the reflected light plotted against wavelength for different input power settings on the laser light source.

It was unexpected to find two slopes to the curve. Because the change in slope was subtle, the power settings on the laser were lowered to see if there were any changes that could be attributed to the input light power. FIG. 6 shows the relative intensity of the reflected light plotted against wavelength for different input power settings on the laser, as indicated in the legend on the right side of the graph. Again, the input wavelength was fixed at 976 nm. All the light down to 0.59 watts can be considered bright, "super-radiant" and uncomfortable to view for an extended time. Unfortunately, a linearized plot of the data in the spectra shown in FIG. 6 was too scattered to reveal any changes in slope.

Figure 7:
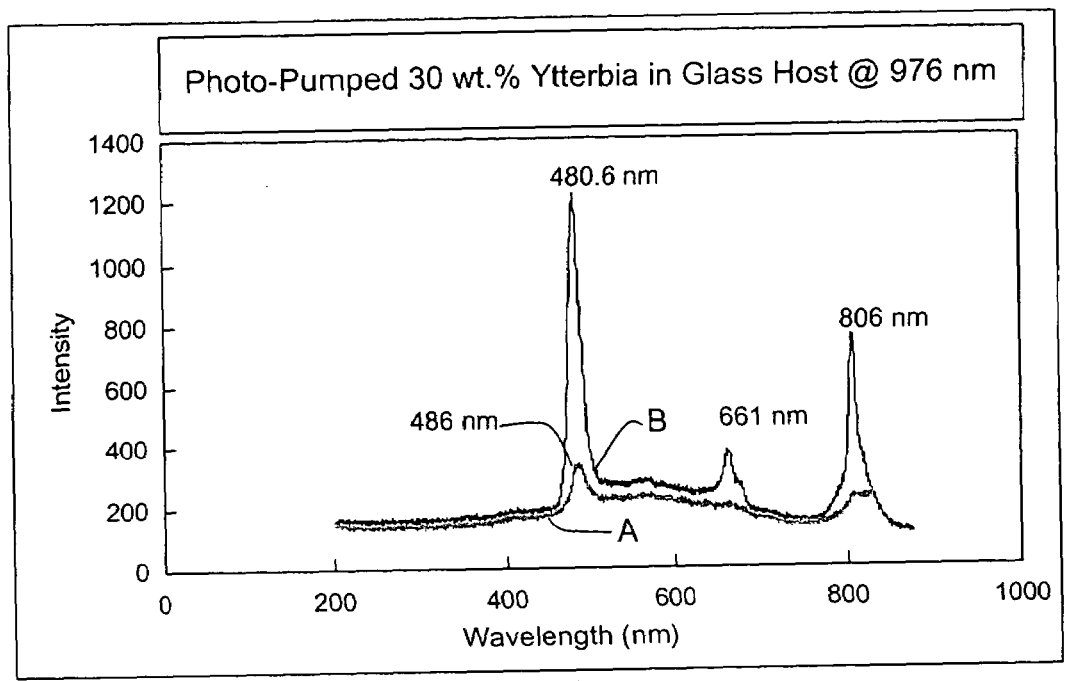
FIG. 7 is a graph of the spectrum of the luminescent light derived from ytterbium oxide irradiated with incident light having a wavelength of about 976 at a power less than about 0.59 watts.

Below 0.59 watts, the emitted light was no longer considered "super-radiant," but there were still some spectral lines that did emit dependent on power settings. A glass host material was prepared with 30 wt. % ytterbia dopant. The material was irradiated with incident light of wavelength 976 nm at a power below 0.59 watts. FIG. 7 shows two spectra taken at lower power settings. The exact power for each curve is not known, but the power was below 0.59 watts.

The overall impression of looking at the emitted light spectrum labeled "A" in FIG. 7, is that it has a blue color indicated by the largest peak at about 480 nm. At slightly higher power levels, the spectrum labeled "B" was obtained. In this case, two additional color lines were observed. The overall impression upon viewing the light of spectrum "B" is that the color of this light was still blue. There does seem to be a common feature of a hump in the background between 400 nm and 800 nm. It is believed that at the higher power settings (>0.59 watts) that this hump feature enlarges to overwhelm the other peaks and is responsible for the "super-radiance" previously described. It is believed that spectral peaks at about 480.6 nm, 661 nm, and 806 nm remain under super-radiant conditions.

Light at about 470 nm is used to cure some polymers, particularly certain polymers used in dental applications. Light at other wavelengths may be used to cure other polymers and be used in other applications. Through the use of suitable filters, it is possible to block light below and above a desired wavelength in a manner which isolates light of the desired wavelength. In this case, one may use filters to block the super-radiant emission below about 460 nm and above about 480 nm leaving super-radiant light in the range from about 460 nm to about 480 nm which would be well-suited for use in curing dental polymers.

It will be appreciated that the present invention may be utilized in laser devices which use a high power infrared laser to induce super-radiant emission in a rare earth compound, such as the ytterbia compound mentioned above. Suitable filters may be used to narrow and isolate the emission to a desired wavelength. Depending upon available filters, one skilled in the art can isolate a desired emission wavelength or range of wavelengths within a desired range, such as $\lambda \pm 20$ nm or $\lambda \pm 10$ nm or $\lambda \pm 5$ nm. It will be appreciated that the foregoing wavelength ranges are given by example only, and the present invention is not limited to the specific wavelength ranges listed above.

It is clear that up-conversion from 976 nm was taking place in the ytterbium oxide as indicated by the peaks that appear at lower wavelengths. The observed emission spectra for ytterbium oxide were unexpected. Trivalent ytterbium has only two known energy levels, the $^2F_{7/2}$ ground state and $^2F_{5/2}$ excitation state. Since there are only two known energy levels for $yb^{3+}$, it would not be expected to produce up-converted luminescence alone. Instead, as discussed above, $Yb^{3+}$ has commonly been used as a sensitizer for at least one other rare earth ion. Based upon the intense white (super-radiant), broadband emission, it is presently believed unknown electron transitions were occurring at very high efficiency. It is believed this light was due to electron transitions and not due to thermal radiation (black-body). Such light is referred to herein as "cold light." Without being bound by theory, it is presently believed that the unknown electron transitions in the ytterbia sample were induced by localized heating from the infrared laser source.

The existence of super-radiant broadband emission of visible light in a highly efficient up-conversion process has broad applications. For example, the rare earth compounds may be utilized in a variety of lighting devices. The compounds may also be used in combination with suitable filters in a tunable visible laser.

Example 2

Figure 8:
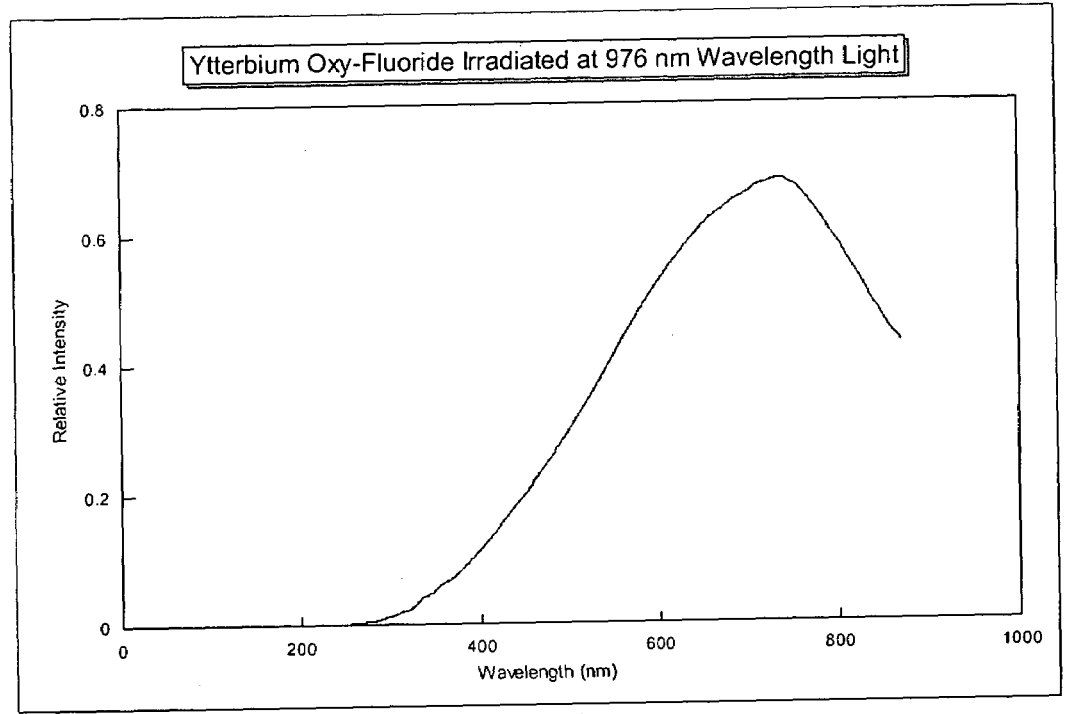
FIG. 8 is a graph of the spectrum of the luminescent light derived from ytterbium oxide irradiated with incident light having a wavelength of about 976 nm at a power of about 1.5 watts.

To see if the environment around the trivalent ytterbium ion ($Yb^{3+}$) has an effect on the spectrum of light emitted, the ytterbia was replaced with ytterbium oxyfluoride for testing. FIG. 8 shows a graph of the spectrum of the luminescent light derived from ytterbium oxyfluoride irradiated with incident light having a wavelength of about 976 nm at a power of about 1.5 watts. This spectrum has features that are not expected only from black-body radiation. Other electron transitions must be taking place in this material. For example, the non-uniform shape of the spectrum with inflections differs from a classic black-body spectrum. In certain regions of the spectra there are characteristic temperatures that far exceed that expected from a thermal component due to black-body radiation, and this light is due to one or more up-conversion effects.

Example 3

Figure 9:
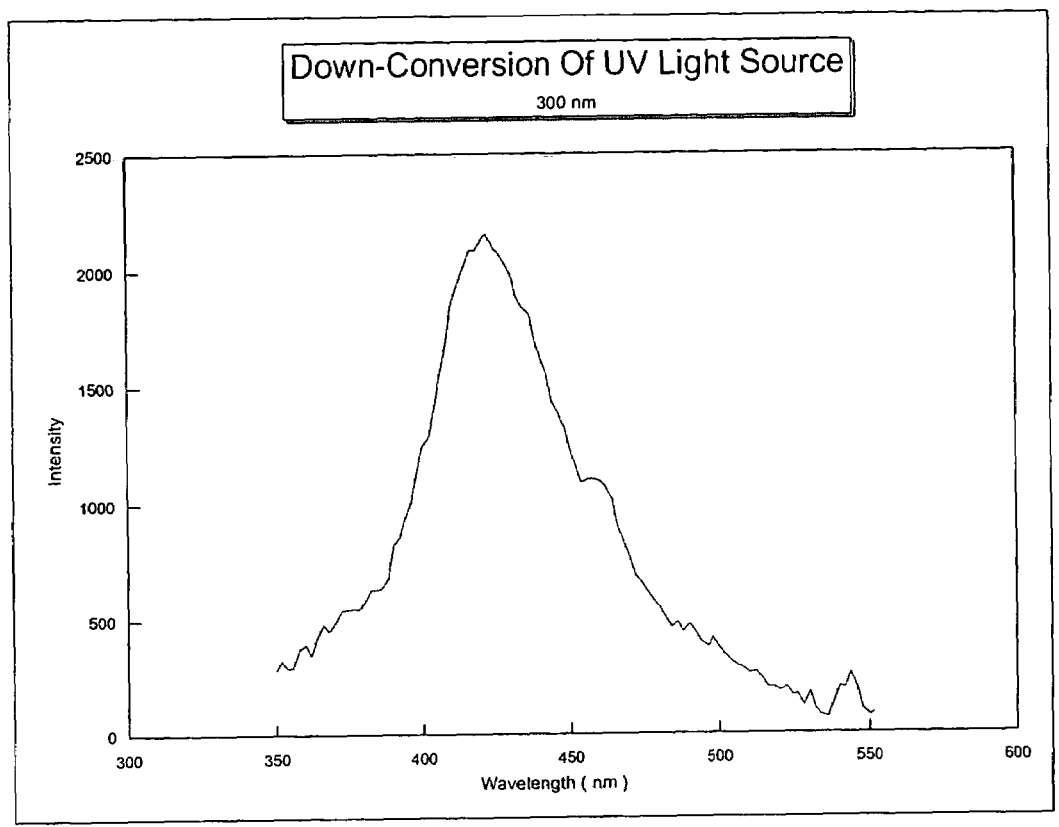
FIG. 9 is a graph of the spectrum of the luminescent light derived from ytterbium oxide irradiated with incident light having a wavelength of about 300 nm.

In addition to the up-conversion effects already noted, the ytterbia sample was examined to see if any luminescent down-conversion in this material were possible. An ytterbium oxide sample was prepared in a glass host and irradiated with 300 nm wavelength light. A luminescent spectrum was generated and shown in FIG. 9. Light was generated from well inside the UV region, 350 nm wavelength light up to about 550 nm wavelength light. There are features to the spectrum indicating multiple electron transitions and not due to heating of the ytterbium oxide. For example, the breadth and non-uniformity of the spectrum differ from a classic black-body radiation spectrum, suggest multiple electron transitions were occurring.

Example 4

Figure 10:
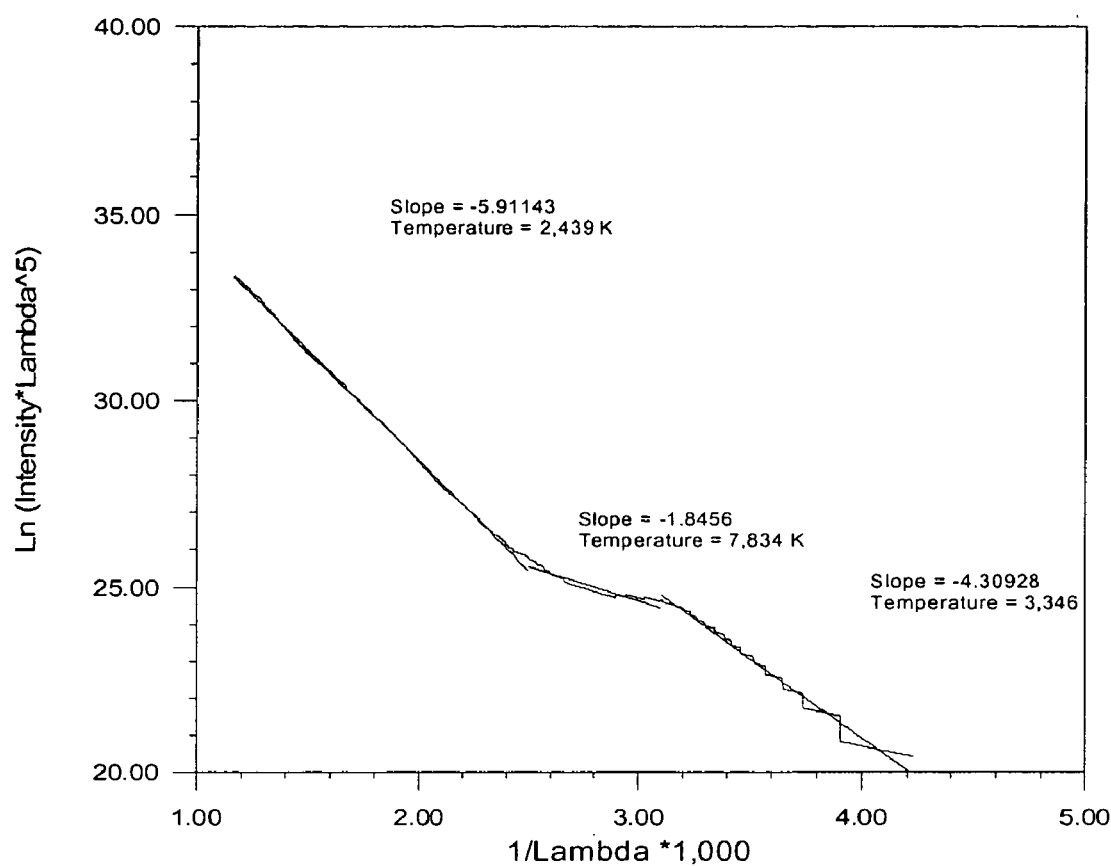
FIG. 10 is a graph of the spectrum of the luminescent light derived from samarium oxide that was irradiated with incident light having a wavelength of 956 nm at a power of about 1.5 watts, plotted in a linearized form based upon the black-body equation.

A sample of samarium oxide was irradiated with incident light having a wavelength of about 956 nm at a power of 1.5 watts. A luminescent spectrum was generated. A linear fit to the spectrum was prepared and shown in FIG. 10. The linear fit shows a more complicated curve that the luminescent spectrum of ytterbia. There is the possibility of two slopes indicating two different temperatures with a large transition region. It is possible that there are three different temperatures in the spectrum as indicated by the three linear fit lines in the figure. The three linear fit lines correspond to color temperatures of about 2439 K, 7834 K, and 3346 K. The existence of more than one color temperature indicates that the spectrum is not a result of only black-body radiation. Non-thermal emissions occurred.

Example 5

Figure 11:
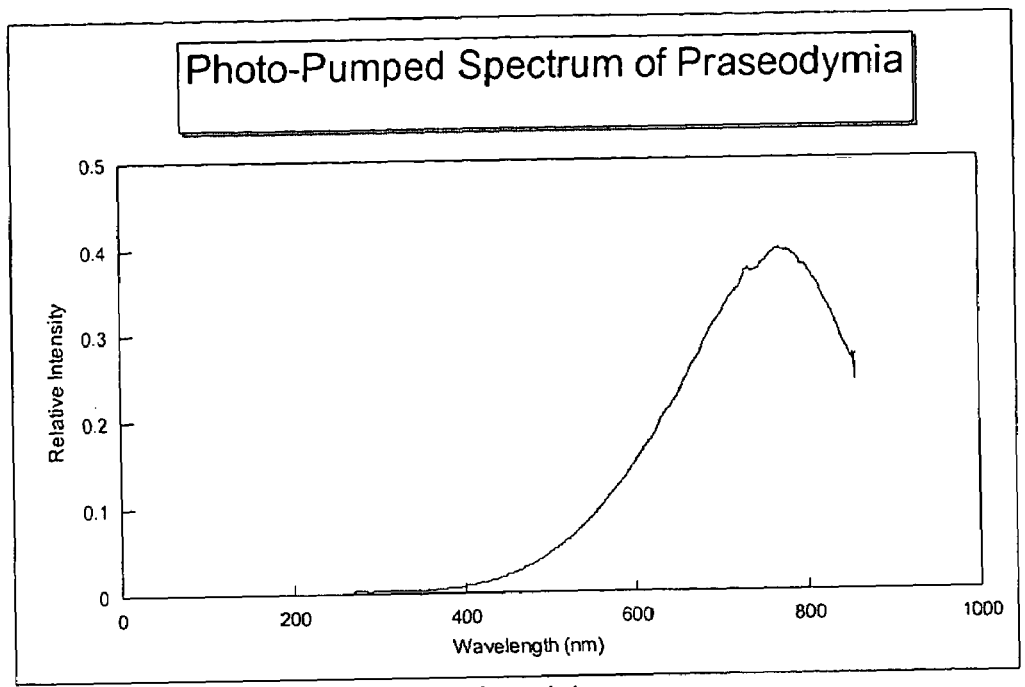
FIG. 11 is a graph of the spectrum of the luminescent light derived from praseodymium oxide irradiated with incident light having a wavelength of about 980 nm at a power of about 1.5 watts.
Figure 12:
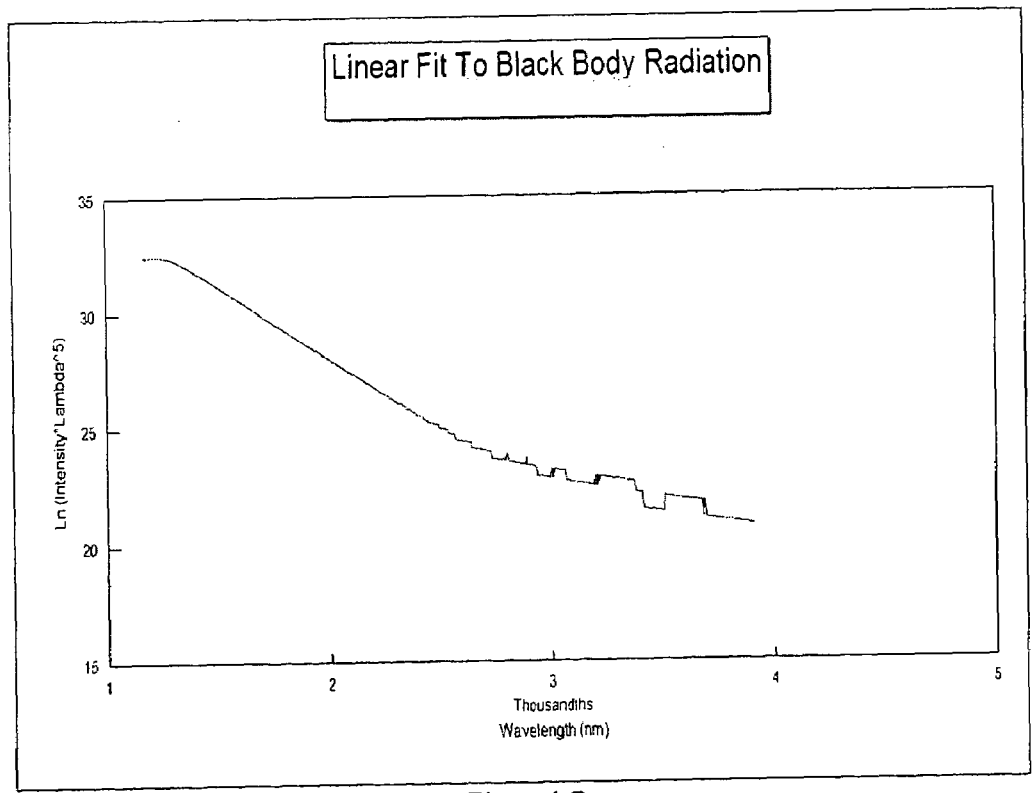
FIG. 12 is a graph of the same data in FIG. 11 plotted in a linearized form based upon the black-body equation.

A sample of praseodymium oxide was irradiated with incident light having a wavelength of about 980 nm at a power of about 1.5 watts. A luminescent spectrum was generated and shown in FIG. 11. A linear fit to the spectrum was prepared and shown in FIG. 12. The linear fit shows that a higher color temperature light was produced that cannot be attributed to the thermal effects of the laser light.

Example 6

Figure 13:
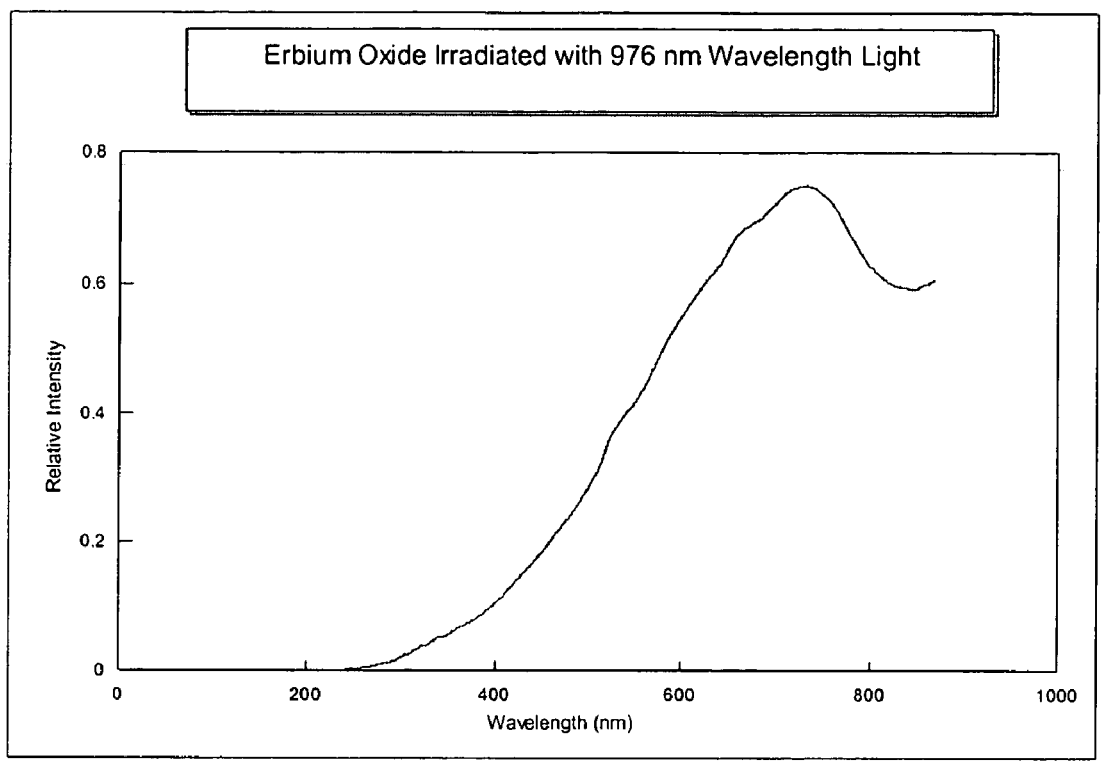
FIG. 13 is a graph of the spectrum of the luminescent light derived from erbium oxide that was irradiated with incident light having a wavelength of 976 nm at a power of about 1.5 watts.

A sample of erbium oxide was irradiated with incident light having a wavelength of about 976 nm at a power of about 1.5 watts. A luminescent spectrum was generated. A linear fit to the spectrum was prepared and shown in FIG. 13. The graph of FIG. 13 is not a good linear fit which indicates the existence of non-thermal emissions.

Example 7

Figure 14:
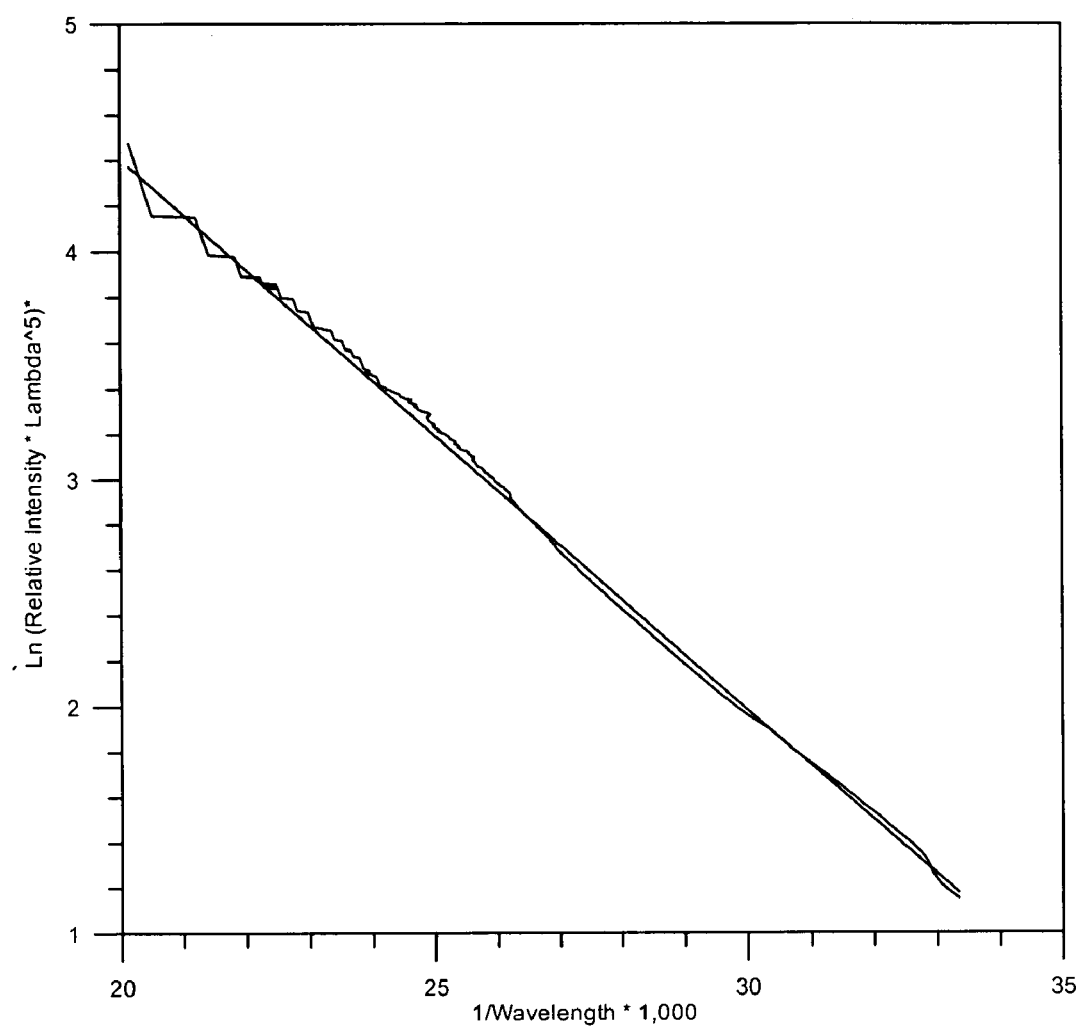
FIG. 14 is a graph of the same data in FIG. 13 plotted in a linearized form based upon the black-body equation.
Figure 15:
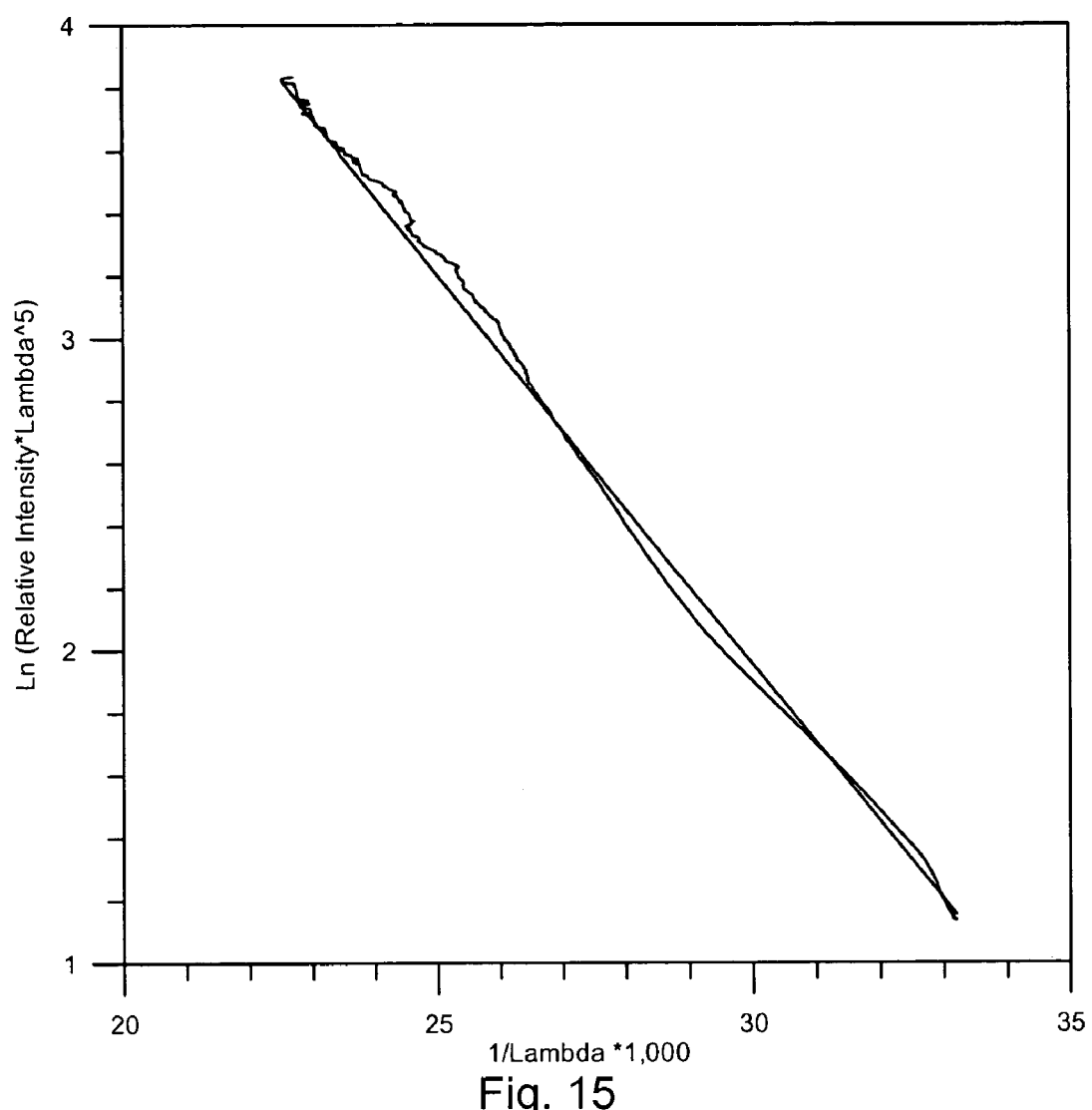
FIG. 15 is a graph of the spectrum of the luminescent light derived from ytterbium fluoride that was irradiated with incident light having a wavelength of 976 nm at a power of about 1.5 watts, plotted in a linearized form based upon the black-body equation.

A sample of ytterbium fluoride was irradiated with incident light having a wavelength of about 976 nm at a power of about 1.5 watts. A luminescent spectrum was generated. A linear fit to the spectrum was prepared and shown in FIG. 14. The graph of FIG. 14 is not a good linear fit which indicates the existence of non-thermal emissions.

Example 8

Various quantities of ytterbia was doped within optical glass samples and tested for up-conversion of infrared light. Infrared light at a wavelength of 976 nm and a power of 1.5 watts was used. The glass samples were obtained from Vitrifunctions, Youngwood, Pa. The Host Glass identifier represents the glass product name used by Vitrifunctions. While all of the samples show some zirconia content in the glass, it has been found subsequently that zirconia is inert and has no effect on the up-conversion properties of the doped glass. The results are summarized in Table 1 below.

TABLE 1

| Host Glass | Host Glass Content (Wt %) | Ytterbia Content (Wt %) | Zirconia Content (Wt %) | Results |
|---|---|---|---|---|
| V572 | 69.5 | 30.2 | 0.3 | Bright Blue |
| V43 | 74.8 | 24.5 | 0.7 | Blue with some green |
| V138 | 77.9 | 21.4 | 0.7 | Blue with some green tint |
| VKT | 88.9 | 9.6 | 1.5 | Sharp blue |
| VTL | 72.4 | 27.0 | 0.7 | Dark blue |
| V572 | 71.5 | 26.7 | 1.8 | Very light blue |
| LAS | 52.2 | 47.3 | 0.5 | Good blue color |
| VTL | 72.9 | 27.1 | 0.01 | Bright blue light visible in ambient room light |

Example 9

A sample of ytterbia, doped with 1 wt. % erbia, was irradiated with incident light having a wavelength of about 976 nm at a power of about 1.5 watts. A luminescent spectrum was generated and shown in FIG. 16. The full power spectrum at 1.5 watts shows evidence of some emission peaks at about 530 nm (blue-green), and 670 nm (red). The addition of secondary dopants such as erbia may alter the shape of the black body curve produced, or may shift the curve as a whole to the right or left. Without being limited to any one theory, it is thought that these effects are observed because of the secondary dopants. Specifically, it is thought that the secondary dopants, which would not normally luminesce when exposed to the specific wavelength of laser light, are activated by the light emitted by the primary rare earth oxide present in the composition.

Figure 16:
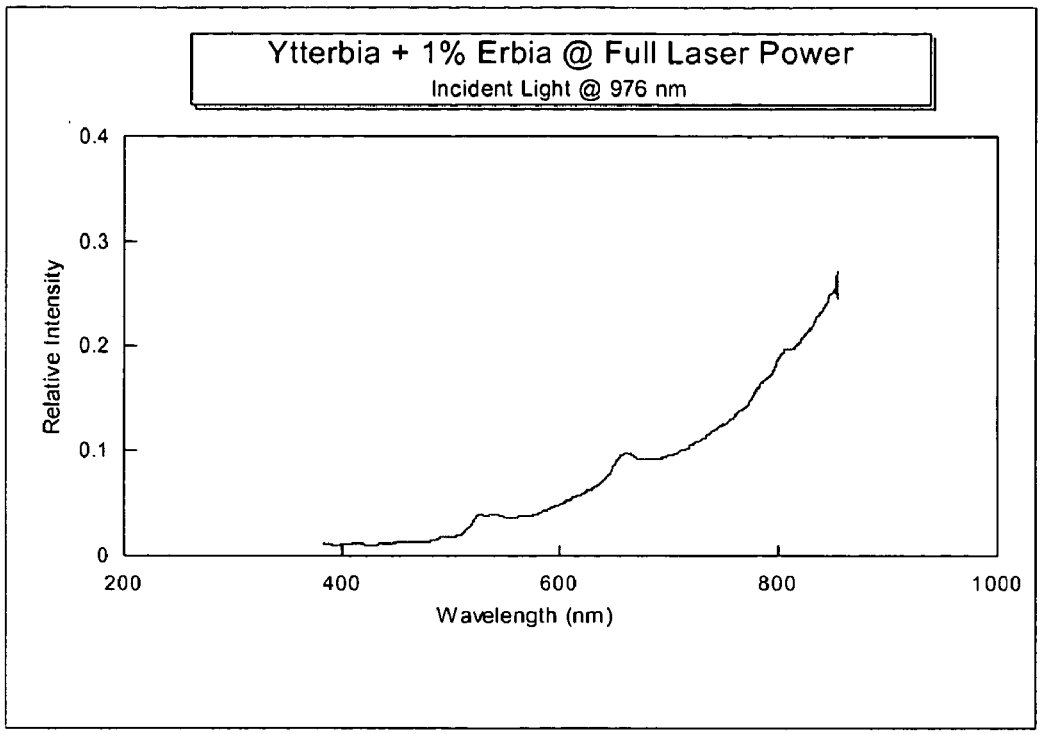
FIG. 16 is a graph illustrating the relative intensity of observed light compared with the wavelength of the light emitted by a composition including ytterbia and 1 wt. % erbia when exposed to a laser of 976 nm wavelength at 1.5 watts.
Figure 17:
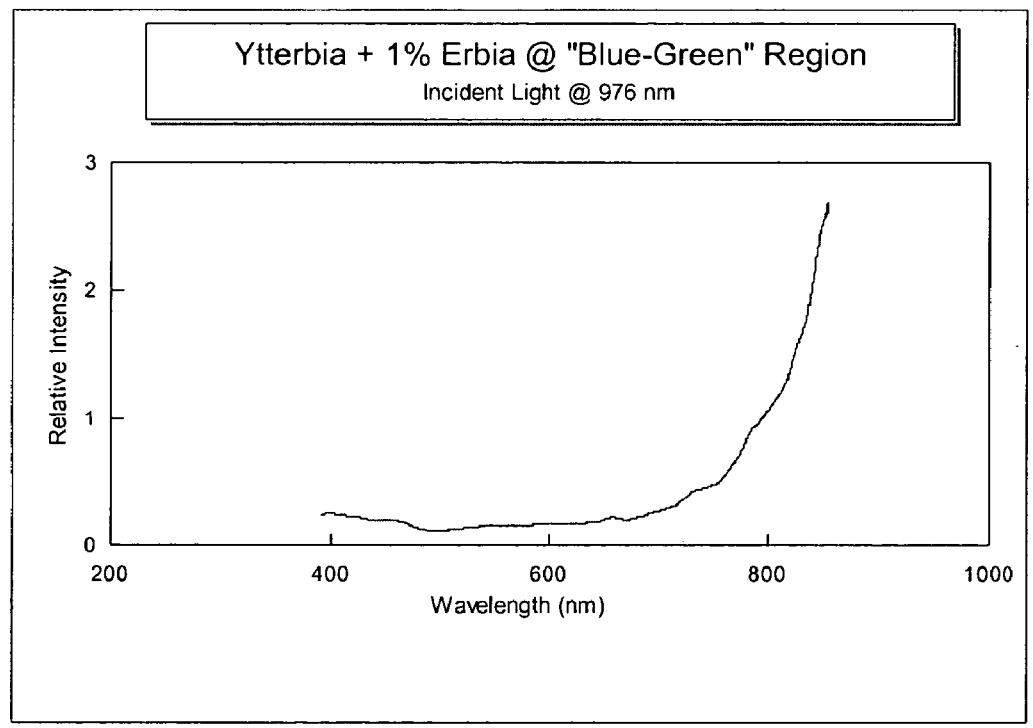
FIG. 17 is a graph illustrating the relative intensity of observed light compared with the wavelength of the light emitted in the "blue-green" region by a composition including ytterbia and 1 wt. % erbia when exposed to a laser of 976 nm wavelength at a lower power.
Figure 18:
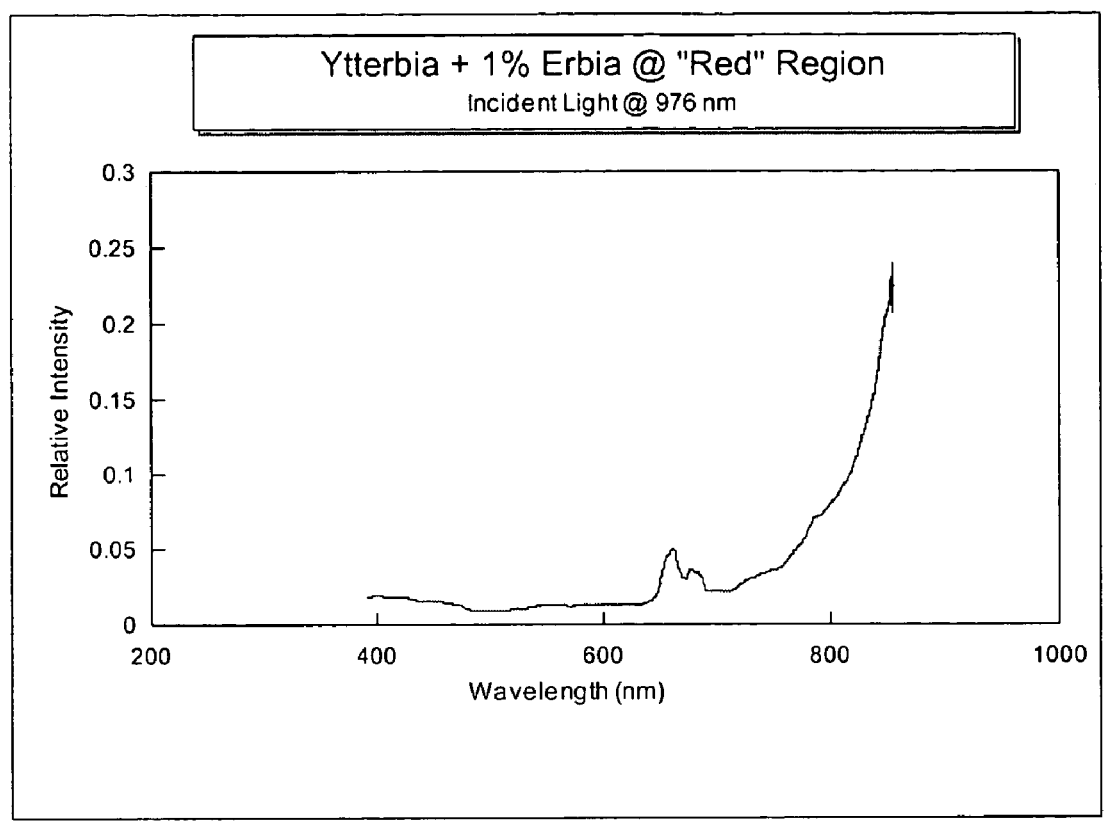
FIG. 18 is a graph illustrating the relative intensity of observed light compared with the wavelength of the light emitted in the "red" region by a composition including ytterbia and 1 wt. % erbia when exposed to a laser of 976 nm wavelength at a lower power.

Referring now to FIG. 17, the relative intensity of light emitted in the "blue-green" region generated by irradiating the 1 wt. % erbia doped ytterbia composition shown in FIG. 16 at a lower incident power level. Referring now to FIG. 18, the relative intensity of light emitted in the "red" region generated by irradiating the 1 wt. % erbia doped ytterbia composition shown in FIG. 16. As above, the composition was exposed to a laser of 976 nm wavelength at a lower incident power level.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A method of up-converting light comprising the steps of:
   obtaining a quantity of a rare earth compound comprising a rare earth element having a stable oxidation state of +2, +3, or +4 and at least one other element selected from chalcogens, halogens, nitrogen, phosphorus, and carbon; and
   irradiating the rare earth compound with incident light having an incident wavelength that is selected to be highly absorbed by the rare earth compound, wherein the compound is irradiated at a sufficient intensity to induce a broadband luminescent emission at wavelengths that are shorter than the incident wavelength, wherein the rare earth compound is irradiated at a sufficient intensity to locally heat the rare earth compound to facilitate electronic transitions which do not normally occur at room temperature.

2. A method of up-converting light according to claim 1, wherein the incident wavelength is sufficiently close to a known energy level of the rare earth element that the incident light is absorbed by the rare earth compound.

3. A method of up-converting light according to claim 1, wherein the incident light is infrared light.

4. A method of up-converting light according to claim 1, wherein the rare earth compound is a rare earth oxide, a rare earth oxyfluoride, or a rare earth fluoride.

5. A method of up-converting light according to claim 1, wherein the rare earth compound comprises ytterbia ($Yb_2O_3$).

6. A method of up-converting light according to claim 1, wherein the rare earth compound comprises erbia ($Er_2O_3$).

7. A method of up-converting light according to claim 1, wherein the rare earth compound comprises samaria ($Sm_2O_3$).

8. A method of up-converting light according to claim 1, wherein the rare earth element is selected from lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

9. A method of up-converting light according to claim 1, wherein the rare earth element is selected from ytterbium (Yb), erbium (Er), samarium (Sm), and praseodymium (Pr).

10. A method of up-converting light according to claim 1, wherein the rare earth compound is irradiated with incident light at a sufficient intensity to induce a super-radiant emission.

11. A method of up-converting light according to claim 10, wherein the super-radiant emission is between 50% and 60% efficient based upon the incident light intensity.

12. A method of up-converting light according to claim 10, wherein the super-radiant emission has an efficiency, based upon the incident light intensity, greater than 50%.

13. A method of up-converting light according to claim 1, wherein the rare earth compound is doped in an optical host material.

14. A method of up-converting light according to claim 1, wherein the optical host material comprises glass.

15. A method of up-converting light according to claim 1, wherein the broadband luminescent emission has a line width at half height greater than about 100 nm.

16. A method of up-converting light according to claim 1, wherein the broadband luminescent emission has a line width at half height greater than about 200 nm.

17. A method of up-converting light comprising the steps of:
   obtaining a quantity of a trivalent ytterbium compound consisting essentially of trivalent ytterbium and at least one other element selected from chalcogens, halogens, nitrogen, and phosphorus; and
   irradiating the trivalent ytterbium compound with incident light having an incident wavelength that is selected to be highly absorbed by the ytterbium compound, wherein the compound is irradiated at a sufficient intensity to induce a plurality of discrete luminescent emissions at wavelengths that are shorter than the incident wavelength.

18. A method of up-converting light according to claim 17, wherein the trivalent ytterbium compound is ytterbia, ytterbium oxyfluoride, or ytterbium fluoride.

19. A method of up-converting light according to claim 17, wherein the incident light is infrared light having a wavelength of about 976 nm±about 25 nm.

20. A method of up-converting light according to claim 17, wherein one of the luminescent emissions has a wavelength of about 480 nm±about 20 nm.

21. A method of up-converting light according to claim 17, wherein the trivalent ytterbium compound is ytterbia, the incident light is infrared light having a wavelength of about 976 nm±about 25 nm, and one of the luminescent emissions has a wavelength of about 480 nm±about 20 nm.

22. A method of up-converting light comprising the steps of:
obtaining a quantity of a rare earth compound consisting essentially of a rare earth element and at least one other element selected from chalcogens, halogens, nitrogen, phosphorus, and carbon, wherein the rare earth compound is not mixed with compounds containing other rare earth elements; and
irradiating the rare earth compound with incident light having an incident wavelength that is selected to be highly absorbed by the rare earth compound, wherein the compound is irradiated at a sufficient intensity to induce a plurality of discrete luminescent emissions at wavelengths that are shorter than the incident wavelength, wherein the rare earth compound is heated to facilitate electronic transitions which do not normally occur at room temperature.

23. A method of up-converting light according to claim 22, wherein the rare earth compound is a rare earth oxide, rare earth oxyfluoride, or rare earth fluoride.

24. A method of up-converting light comprising the steps of:
obtaining a quantity of a rare earth compound consisting essentially of a rare earth element and at least one other element selected from chalcogens, halogens, nitrogen, phosphorus, and carbon, wherein the rare earth compound is not mixed with compounds containing other rare earth elements; and
irradiating the rare earth compound with incident light having an incident wavelength that is selected to be highly absorbed by the rare earth compound, wherein the compound is irradiated at a sufficient intensity to induce broadband luminescent emission at wavelengths that are shorter than the incident wavelength, wherein the rare earth compound is heated to facilitate electronic transitions which do not normally occur at room temperature.

25. A method of up-converting light according to claim 24, wherein the rare earth compound is a rare earth oxide, rare earth oxyfluoride, or rare earth fluoride.

26. A method of down-converting light comprising the steps of:
obtaining a quantity of a rare earth compound comprising a rare earth element and at least one other element selected from chalcogens, halogens, nitrogen, and phosphorus; and
irradiating the rare earth compound with incident light having an incident wavelength that is selected to be highly absorbed by the rare earth compound, wherein the compound is irradiated at a sufficient intensity to induce a broadband luminescent emission at wavelengths that are longer than the incident wavelength, wherein the rare earth compound is irradiated at a sufficient intensity to heat the rare earth compound to facilitate electronic transitions which do not normally occur at room temperature.

27. A method of down-converting light according to claim 26, wherein the incident wavelength is sufficiently close to a known energy level of the rare earth element that the incident light is absorbed by the rare earth compound.

28. A method of down-converting light according to claim 26, wherein the incident light is ultraviolet light.

29. A method of down-convening light according to claim 26, wherein the rare earth compound is a rare earth oxide, a rare earth oxyfluoride, or a rare earth fluoride.

30. A method of down-converting light according to claim 26, wherein the rare earth compound is selected from ytterbia ($Yb_2O_3$), erbia ($Er_2O_3$), and samaria ($Sm_2O_3$).

31. A method of down-converting light according to claim 26, wherein the rare earth compound is doped in an optical host material.

32. A method of down-converting light according to claim 26, wherein the broadband luminescent emission has a line width greater than about 100 nm.

33. A method of down-converting light according to claim 26, wherein the broadband luminescent emission has a line width greater than about 200 nm.

34. An apparatus for up-converting light comprising:
a light source for generating incident light at an incident wavelength;
a quantity of a rare earth compound comprising a rare earth element and at least one other element selected from chalcogens, halogens, nitrogen, and phosphorus; and
means for irradiating the rare earth compound with incident light at the incident wavelength, wherein the incident wavelength is selected to be highly absorbed by the rare earth compound, wherein the compound is irradiated at a sufficient intensity to induce a broadband luminescent emission at wavelengths that are shorter than the incident wavelength, wherein the rare earth compound is irradiated at a sufficient intensity to locally heat the rare earth compound to facilitate electronic transitions which do not normally occur at room temperature.

35. An apparatus for up-converting light according to claim 34, further comprising one or more filters which block emitted light having an undesired wavelength and isolate emitted light having a desired wavelength.

36. An apparatus for up-converting light according to claim 35, wherein the rare earth compound is ytterbia, the incident wavelength is about 976 nm±about 25 nm, and the desired wavelength is about 470 nm±about 10 nm.

* * * * *